US012285774B2

(12) United States Patent
Kinzer

(10) Patent No.: US 12,285,774 B2
(45) Date of Patent: Apr. 29, 2025

(54) PERSONAL HYGIENE APPARATUS FOR PATIENTS WITH REDUCED MOBILITY

(71) Applicant: LINAUS S.R.L., Verona (IT)

(72) Inventor: Alberto Kinzer, Verona (IT)

(73) Assignee: LINAUS S.R.L., Verona (IT)

( * ) Notice: Subject to any disclaimer, the term of this patent is extended or adjusted under 35 U.S.C. 154(b) by 392 days.

(21) Appl. No.: 17/657,059

(22) Filed: Mar. 29, 2022

(65) Prior Publication Data

US 2022/0323983 A1 Oct. 13, 2022

(30) Foreign Application Priority Data

Apr. 9, 2021 (IT) ........................ 102021000009008

(51) Int. Cl.
*B05B 14/00* (2018.01)
*B05B 9/01* (2006.01)
*B05B 9/04* (2006.01)

(52) U.S. Cl.
CPC ................ *B05B 14/00* (2018.02); *B05B 9/01* (2013.01); *B05B 9/0403* (2013.01)

(58) Field of Classification Search
CPC ........ E03C 2201/90; E03C 1/326; E03C 1/22; E03C 1/0408; E03C 1/18; E03C 2201/30; A47K 1/04; A47K 7/08; B05B 9/01; B05B 9/0403; B05B 14/00; B05B 1/3093; B05B 1/18; B05B 7/32; F16K 23/00; Y10T 137/85954; Y10T 137/87917
See application file for complete search history.

(56) References Cited

U.S. PATENT DOCUMENTS 4,197,872 A * 4/1980 Parker ................. A01M 7/0092 137/553
5,318,056 A * 6/1994 Kusz ....................... B08B 3/006 134/99.1
6,754,912 B1 * 6/2004 Hayashi .................... E03D 9/08 239/468

(Continued)

FOREIGN PATENT DOCUMENTS

DE 9110650 * 10/1991 ............. B05B 12/14
WO WO-2014116260 A1 * 7/2014 ............... B05B 7/20
WO 2020/198896 A1 10/2020

OTHER PUBLICATIONS

Search Report and Written Opinion for Italian Application No. 102021000009008 filed on Apr. 9, 2021, on behalf of Linaus S.R.L. Date of Completion of Report: Nov. 25, 2021. 8 Pages (Italian Original + English WO Translation).

*Primary Examiner* — Christopher R Dandridge
(74) *Attorney, Agent, or Firm* — Steinfl + Bruno LLP

(57) ABSTRACT

An apparatus for personal hygiene of patients with reduced mobility is presented. The apparatus includes a support casing, a housing for accommodating a removable tank, a grippable washing head, a pump, a hydraulic circuit, and a valve assembly. A working operation mode and a standby operation mode are provided. In the working operation mode, the valve assembly determines in the hydraulic circuit a water supply path from the tank, to the pump, to the washing head and finally out of the delivery mouth. In the stand-by operation mode, the valve assembly determines in the hydraulic circuit a water recirculation path from the tank, to the pump, to the washing head and finally back to the tank, without water flowing out of the delivery mouth.

11 Claims, 3 Drawing Sheets

(56) References Cited

U.S. PATENT DOCUMENTS

| | | | | |
|---|---|---|---|---|
| 9,624,083 | B2 * | 4/2017 | Tuggle | B67D 1/0004 |
| 2015/0217312 | A1 * | 8/2015 | Hines | B05B 11/1016 222/333 |
| 2017/0356172 | A1 | 12/2017 | Searcy | |

* cited by examiner

PERSONAL HYGIENE APPARATUS FOR PATIENTS WITH REDUCED MOBILITY

CROSS-REFERENCE TO RELATED APPLICATIONS

The present application claims priority to Italian Patent Application No. 102021000009008 filed on Apr. 9, 2021 and incorporated herein by reference in its entirety.

FIELD

The present disclosure relates to the personal hygiene of patients with reduced autonomous mobility, who need to be washed by caregivers due to their condition.

BACKGROUND

These patients are washed by an operator, such as a personal caregiver or social worker. To this end, the operator may choose to proceed directly at the bedside or by transferring the patient to a suitably shaped bathtub or shower. Precisely because of the patient's reduced mobility, washing in the bathtub or shower is often problematic, especially when transferring from the bed to the bathtub or shower and vice versa. In most cases, the presence of two or more operators is needed both for the transfers and the actual washing. Furthermore, the transfers can be somewhat risky for the patient, because they involve the risk of accidental slips and falls.

It is therefore frequent for washing to be carried out directly at the bedside, thus limiting the patient's displacements. To this end, the patient's bed is arranged so as to simulate the use of a bathtub. The operator undresses and places the patient in a suitable position so that the bed surface can be covered with a waterproof sheet. During washing or in any case at the end of the operation, the water accumulated on the surface of the waterproof sheet is removed through a suction device. Once the washing has been completed, the operator dries the patient, removes the waterproof sheet and dresses the patient again. Although where possible these operations are carried out by two operators, a single operator may be sufficient.

While therefore, bedwashing is somewhat safer and even more comfortable for operators, it is not always comfortable for the patient, as will be explained below.

In fact, water heated to the most appropriate temperature for the comfort of the patient must obviously be used for washing. Normally, mobile apparatuses are used, typically on a trolley, so that they can be easily brought near the beds of the patients who need to be washed; the warm water is in an internal tank, which is filled before washing. The apparatus is provided with a pumping system that brings water to a washing head (basically shaped like a normal bath hand shower), through appropriate ducts.

While a patient is being washed, interruptions in the water delivery are usually provided to allow the operator to perform other operations, such as soaping or changing the patient's position.

In addition, due to the fact that washing takes place at the bedside, it is essential to limit the quantity of water used, to allow it to be properly disposed of. Because of the large quantity of water that must be used with these devices to carry out a washing (from 6000 to 7000 ml), they are normally also provided with a suction pump connected to a suction sleeve, which sucks up the liquids that settle on the surface of the waterproof sheet placed on the mattress and feeds them into a second tank, before they overflow outside the waterproof sheet. To facilitate this disposal, it may be necessary to interrupt the water delivery from time to time.

It follows that in bedwashing the water delivery is inevitably intermittent: moments when there is a delivery alternate with moments when the delivery is interrupted.

During delivery interruptions, the warm water present in the washing apparatus ducts remains still, waiting for a resumption of the delivery that allows it to flow out again; in this condition, the still water cools down. When the operator then resumes delivery, if the delivery pause was relatively long, the first quantity of water delivered will be colder and then it will return again warm shortly afterwards. These variations in temperature are obviously very unpleasant for the washed patient, and can contribute to stimulating intestinal discharges that cause pollution of the bed surface and of the body part in contact therewith, with the danger that any dressings or injured parts of the skin may become contaminated or infected.

SUMMARY

The problem underlying the present disclosure is to make available a washing apparatus for patients with a reduced mobility that allows comfortable and safe washing.

In particular, the personal hygiene apparatus for patients with a reduced mobility comprises:

- a support casing,
- a housing for accommodating a removable tank for washing water, formed on the casing,
- a grippable washing head, provided with at least one delivery mouth,
- a pump,
- a hydraulic circuit, which connects the tank, the pump and the washing head with each other,
- a valve assembly in the hydraulic circuit; wherein the apparatus provides for a working operation mode and a stand-by operation mode, where the valve assembly:
- in the working operation mode, determines in the hydraulic circuit a water supply path from the tank, to the pump, to the washing head and finally out of the delivery mouth;
- in the stand-by operation mode, determines in the hydraulic circuit a water recirculation path from the tank, to the pump, to the washing head and finally back to the tank, without water flowing out of the delivery mouth.

In this way, the water not delivered for washing in the stand-by operation mode does not remain stationary in the apparatus ducts, but is continuously recirculated and returns to the tank. When the apparatus switches to the working operation mode, the water delivered has the water temperature of the tank; therefore, when delivery is resumed after an interruption, the water temperature is the same as before the interruption, which is of great benefit to the patient.

Preferably, the valve assembly comprises a first and a second three-way valve operating together. This configuration makes it easy to create the two paths, the supply path and the recirculation path.

For example, and preferably, the hydraulic circuit comprises:

- an intake duct, between the tank and the pump,
- a feed duct, between the pump and the first valve,
- a connection duct, between the first and the second valve,
- a recovery duct between the second valve and the tank,
- a recirculation duct between the first valve and the washing head, a delivery duct between the second valve and the washing head.

Preferably, the delivery duct is part of both the supply path and the recirculation path, i.e. it is always run by washing water, both in the working operation mode and in the stand-by operation mode.

In this way, when switching from the stand-by to the working operation mode, the water at the appropriate temperature is immediately available in the delivery duct, ready to be delivered from the delivery mouth of the washing head.

Preferably, the water supply path comprises the intake duct, the feed duct, the connection duct and the delivery duct.

Preferably, the water recirculation path comprises the intake duct, the feed duct, the recirculation duct, the delivery duct and the recovery duct.

Preferably, the apparatus comprises a one-way valve in the intake duct. This valve ensures the regularity of the flow, not only by preventing any possible unwanted backflow into the intake duct, but above all by eliminating the risk of emptying the intake duct and the consequent possible disengagement of the pump.

Preferably, the apparatus comprises an expansion vessel in the feed duct. This ensures a constant pressure in the duct and thus promotes the regularity of the water flow.

Preferably, the apparatus comprises a pressure reducer in the recirculation duct. The pressure reducer ensures that the pressure at which the water reaches the delivery head during the stand-by operation mode is relatively low, lower than the pressure at which it reaches it in the working operation mode; it is thus possible—if desired—to do without a tap or the like to control the delivery.

Preferably, the apparatus comprises a chamber for alternating flows in the washing head, connected to the delivery duct, to the recirculation duct and to the delivery mouth.

Preferably, the apparatus comprises a minimum pressure valve in the washing head, between the alternating chamber and the delivery mouth. In this way, if there is a pressure reducer in the recirculation duct, it is possible to activate or deactivate the delivery (i.e. switch from the stand-by to the working operation mode and vice versa) simply by acting on the valve assembly, without having to provide and operate a tap on the delivery head and without having to stop the pump. In fact, in the working operation mode, the water reaches the alternating chamber through the delivery duct, and has a relatively high pressure which causes the minimum pressure valve to open and thus the water to be delivered from the delivery mouth.

In the stand-by operation mode, on the other hand, the water reaches the alternating chamber through the recirculation duct and has a relatively low pressure, thanks to the pressure reducer; therefore, the minimum pressure valve remains closed and there is no water delivery from the delivery mouth.

BRIEF DESCRIPTION OF THE DRAWINGS

Further characteristics and advantages of the present invention will appear more clearly from the following detailed description of a preferred embodiment thereof, made with reference to the appended drawings. In such drawings.

DETAILED DESCRIPTION

Figure 1:
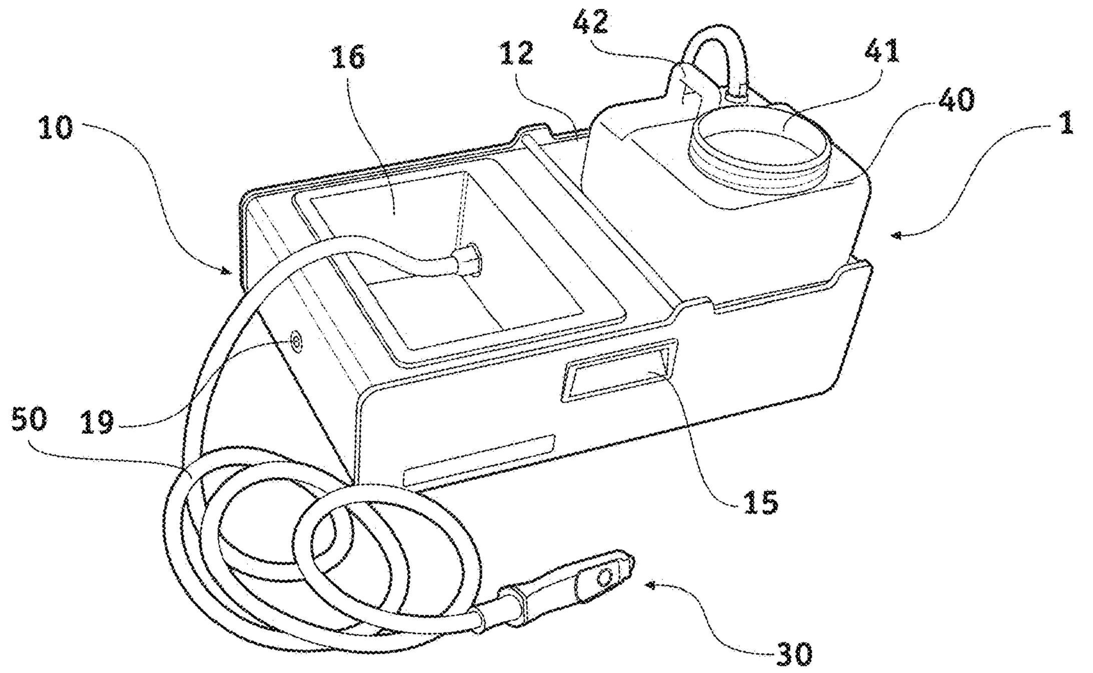
FIG. 1 shows an apparatus according to the invention.

In the figures, 1 generally indicates an apparatus for the personal hygiene of patients with a reduced mobility; in particular, the apparatus 1 allows the washing of a patient by an operator. The apparatus 1 comprises a support casing 10, a washing head 30 and a flexible cord 50, which connects the washing head 30 to the casing 10.

On the casing 10, a housing 12 is formed which is suitable for accommodating a removable tank 40 made of a plastic material, provided with a removable cap 41 for filling, with a handle 42 for carrying and with an opening 43 in which a two-way quick-connect connector 44 is housed; in use, the tank 40 is filled with washing water, taken elsewhere (for example from a tap in a toilet) at the temperature suitable for washing a patient. The housing 12 is formed by a rest surface which is lowered with respect to raised edges, so that the tank 40 can rest on it and be kept retained there by the raised edges during the displacements of the apparatus 1.

Figure 5:
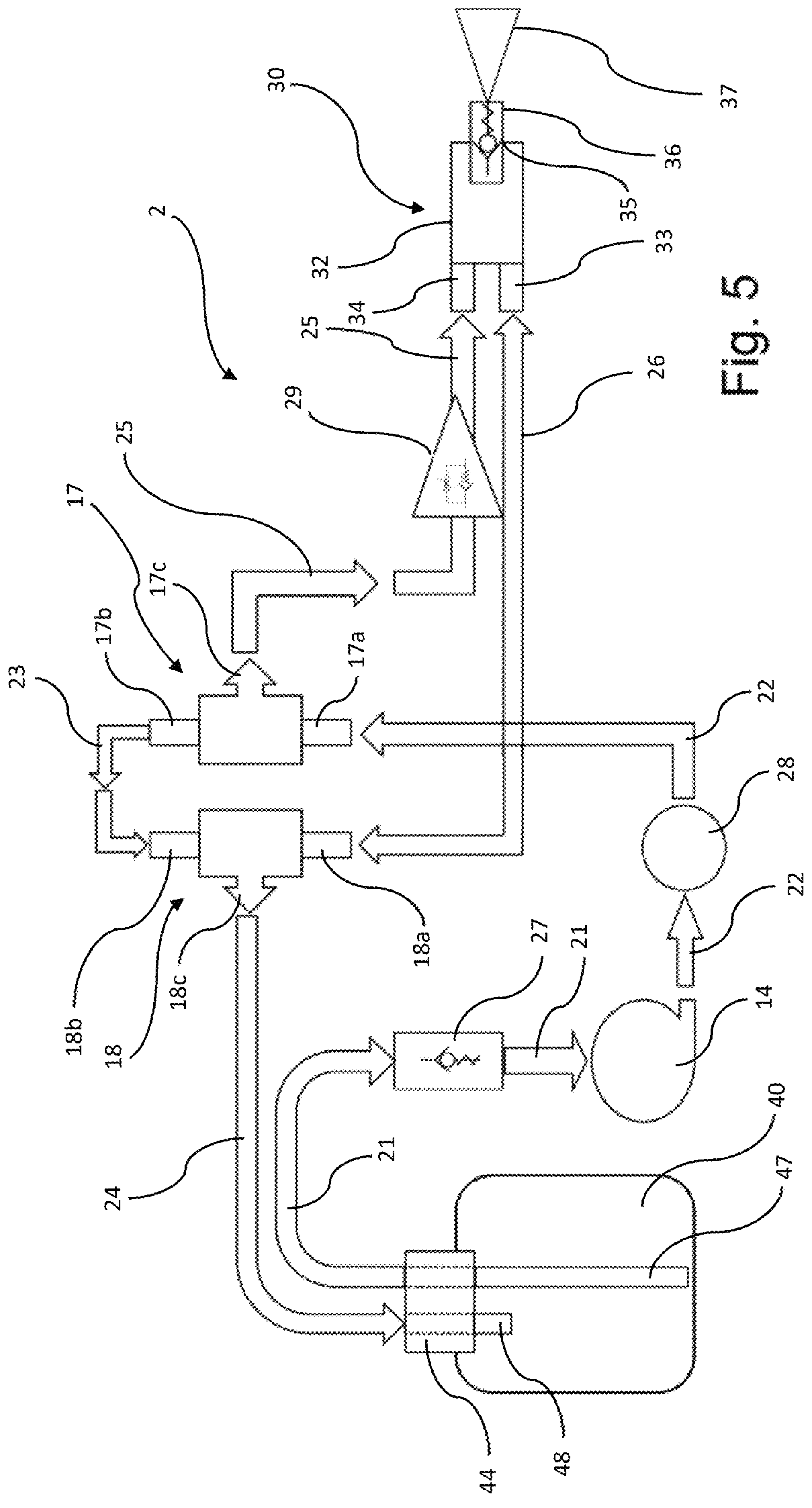
FIG. 5 is a functional diagram of the apparatus of FIG. 1.

The apparatus 1 further comprises a pump 14, housed in the casing 10 and electrically powered by cables (not shown in the figures); it should be noted that the pump 14—as well as other components of the apparatus 1—is not visible in FIG. 1, but is schematically represented in FIG. 5.

The casing 10 further comprises handles 15 for ease of carrying, a compartment 16 for housing the cord 50 when not in use and a switch 19 for the electrical power supply; the power cables and circuits (conventional per se) are not shown. The compartment 16 can optionally be provided with a cover if necessary (not shown in the figures).

The apparatus 1 further comprises a hydraulic circuit, collectively referred to as 2, which connects the tank 40, the pump 14 and the washing head 30 together. The hydraulic circuit comprises a valve assembly housed in the casing 10, formed by two valves 17 and 18, in particular two three-way solenoid valves, each with a first mouth 17*a*, 18*a*, a second mouth 17*b*, 18*b*, and a third mouth 17*c*, 18*c*; as for the pump 14, the power cables of the valves 17 and 18 are not shown in the figures, and the valves 17 and 18 themselves are shown only schematically in FIG. 5. The valve 17 can assume two positions: a first position in which the first mouth 17*a* is connected to the second mouth 17*b* while the third mouth 17*c* is isolated from the other mouths 17*a* and 17*b*, and a second position in which the first mouth 17*a* is connected to the third mouth 17*c* while the second mouth 17*b* is isolated from the other mouths 17*a* and 17*c*. Similarly, the valve 18 can assume two positions: a first position in which the first mouth 18*a* is connected to the second mouth 18*b* while the third mouth 18*c* is isolated from the other mouths 18*a* and 18*b*, and a second position in which the first mouth 18*a* is connected to the third mouth 18*c* while the second mouth 18*b* is isolated from the other mouths 18*a* and 18*c*.

Figure 2:
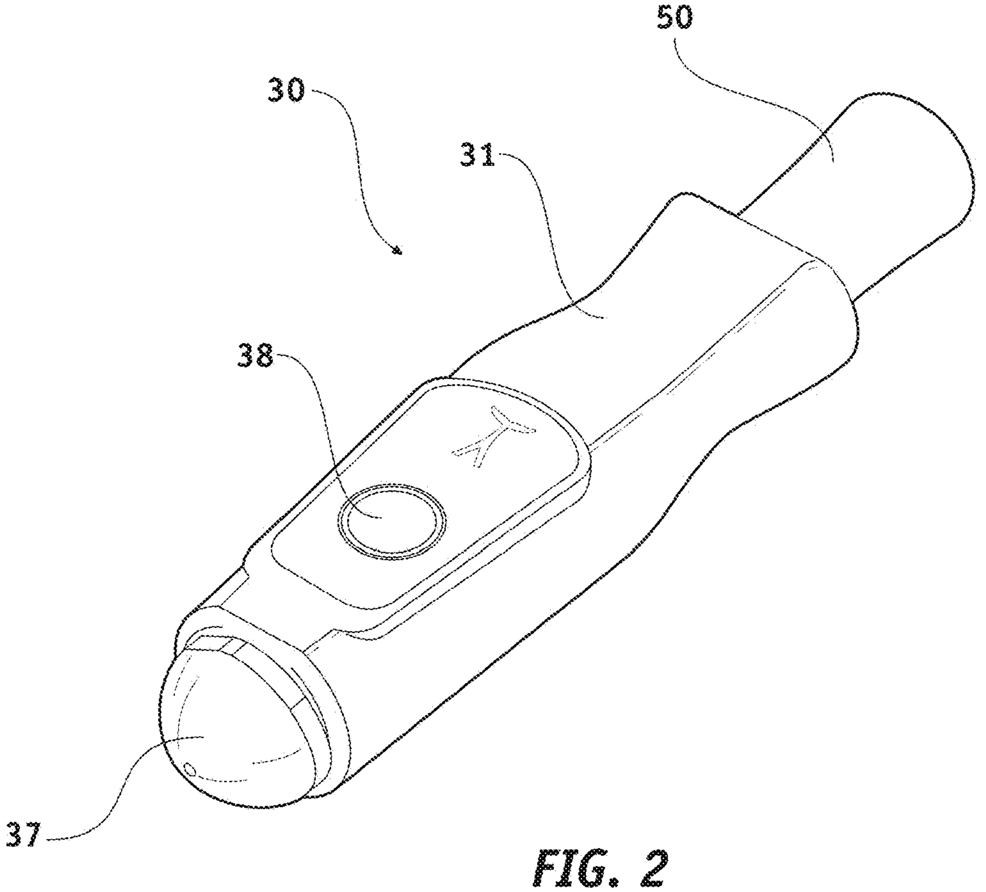
FIG. 2 shows the washing head of the apparatus of FIG. 1.
Figure 3:
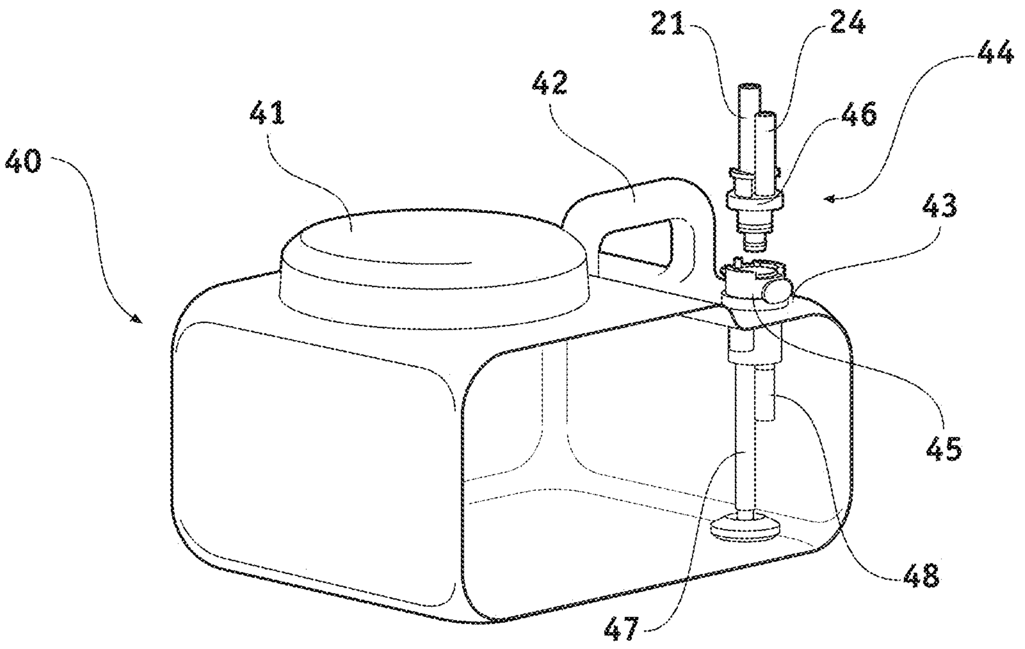
FIG. 3 is a partially interrupted perspective view of the tank of the apparatus of FIG. 1.
Figure 4:
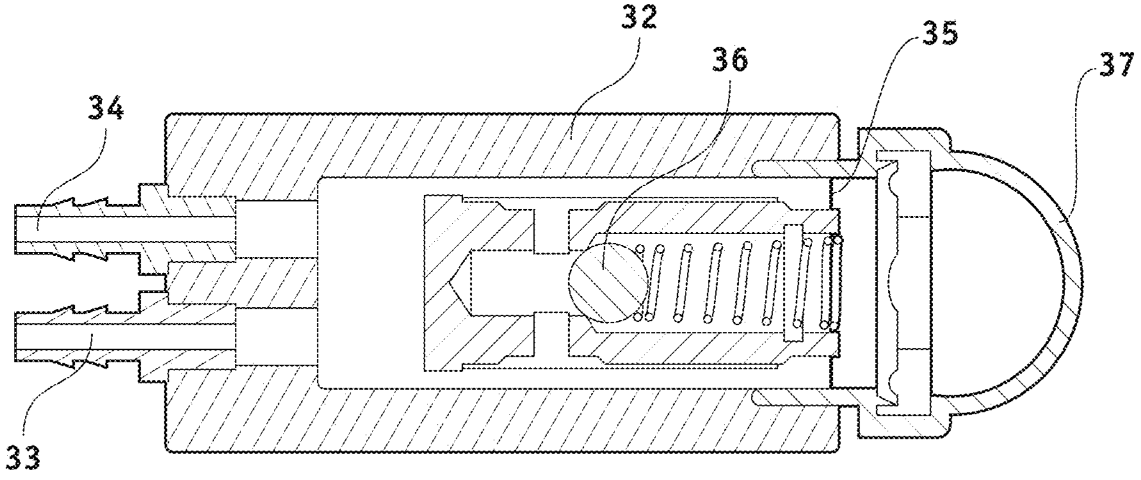
FIG. 4 is a sectional view of the internal components of the washing head of FIG. 2.

The washing head 30, as shown in FIGS. 2 and 4, comprises a grippable body 31 within which an elongated, substantially cylindrical chamber 32 is housed to manage the alternation of the flows. The washing head 30 has a first inlet mouth 33 and a second inlet mouth 34, arranged side by side and both facing the chamber 32, as well as a delivery mouth 35, substantially opposite the inlet mouths 33 and 34. At the delivery mouth 35, a minimum pressure valve 36, inside the chamber 32, as well as a spray nozzle 37, outside the chamber 32, are provided.

The hydraulic circuit 2 also comprises a plurality of ducts, in particular:

- an intake duct 21, which at one end is connected to the two-way connector 44 and at the other end is connected to the pump 14, to one of its intake mouths;
- a feed duct 22, which at one end is connected to the pump 14, to one of its feed mouths, and at the other end is connected to the first mouth 17*a* of the first valve 17;
- a connection duct 23, which at one end is connected to the second mouth 17*b* of the first valve 17 and at the other end is connected to the second mouth 18*b* of the second valve 18;
- a recovery duct 24, which at one end is connected to the third mouth 18*c* of the second valve 18 and at the other end is connected to the two-way connector 44;
- a recirculation duct 25, which at one end is connected to the third mouth 17*c* of the first valve 17 and at the other end is connected to the second inlet mouth 34 of the washing head 30;
- a delivery duct 26, which at one end is connected to the first mouth 18*a* of the second valve 18 and at the other end is connected to the first inlet mouth 33 of the washing head 30.

The two-way connector 44 comprises two quick-connect parts: a fixed part 45, stably mounted on the opening 43, and a movable part 46, to which the intake duct 21 and the recovery duct 24 are connected. More precisely, the movable part 46 has a first mouth to which the intake duct 21 is connected and a second mouth to which the recovery duct 24 is connected; the fixed part 45 has a first mouth to which a drawing duct 47 is connected and which reaches as far as the bottom of the tank 40 and a second mouth to which a discharge duct 48 is connected. When the movable part 46 is coupled to the fixed part 45, the respective first mouths are hydraulically connected to each other, just as the respective second mouths are hydraulically connected to each other; consequently, the intake duct 21 is connected to the drawing duct 47, while the recovery duct 24 is connected to the discharge duct 48.

The intake 21, feed 22, connection 23 and recovery 24 ducts are partially housed in the casing 10: the sections of the intake 21 and recovery 24 ducts which reach the two-way connector 44 are external. The recirculation 25 and delivery 26 ducts are mainly housed in the cord 50.

The hydraulic circuit 2 further comprises a one-way valve 27 in the intake duct 21, an expansion vessel 28 in the feed duct 22 and a pressure reducer 29 in the recirculation duct 25.

The washing head 30 comprises a button 38 for controlling the valves 17 and 18, so that they can be set to their first or second position, at the choice of the operator. Electric cables between the button 38 and the valves 17 and 18 pass through the cord 50, but are not shown in the drawings.

The operation of the apparatus 1 will now be described.

When an operator is about to wash a patient, he sets up the apparatus 1 by placing the tank 40, previously filled with warm water at the desired temperature, in the housing 12. The tank is then connected to the hydraulic circuit 2 by simply engaging the movable part 46 on the fixed part 45 of the two-way connector 44.

Once the patient has been prepared for washing, e.g. by setting up the bed with a waterproof sheet, the apparatus 1—which has been brought close to the patient—is switched on, by means of the switch 19, and automatically switches to its stand-by operation mode; this puts the pump 14 into operation and the valves 17 and 18 each move into their second position.

The warm water is thus circulated in the hydraulic circuit 2 according to the recirculation path. It is taken from the tank 40 through the drawing duct 47, flows into the intake duct 21 passing through the one-way valve 27, and reaches the pump 14. The water that has exited the pump 14 then flows into the feed duct 22, enters the first valve 17 from its first mouth 17*a*, exits the third mouth 17*c* of the first valve 17, flows into the recirculation duct 25 through the pressure reducer 29, and enters the chamber 32 from its second inlet mouth 34.

The water pressure in the chamber 32 is not sufficient to open the minimum pressure valve 36 and therefore the water does not exit from the delivery mouth 35, but from the first inlet mouth 33, which is free.

From the first inlet mouth 33 of the chamber 32, the water flows into the delivery duct 26 and reaches the second valve 18, entering it from its first mouth 18*a* and exiting it from its third mouth 18*c*; it then flows into the recovery duct 24 and returns to the tank 40 through the discharge duct 48.

As can be seen, in this stand-by operation mode, warm water is present in the chamber 32 on the washing head 30, as well as in all the ducts with the only exception of the connection duct 23 between the two valves 17 and 18; the connection duct 23 is of minimum length, i.e. the second mouth 17*b* of the first valve 17 is connected directly to the second mouth 18*b* of the second valve 18.

When the operator wants to start washing, he grips the washing head 30 and—by means of the button 38—he activates the working operation mode: while the pump 14 remains in operation, the valves 17 and 18 move to their first position.

The warm water is thus circulated in the hydraulic circuit 2 according to the delivery path. It is taken from the tank 40 through the drawing duct 47, flows into the intake duct 21 passing through the one-way valve 27, and reaches the pump 14. The water that has exited the pump 14 then flows into the feed duct 22, enters the first valve 17 from its first mouth 17*a*, exits the second mouth 17*b* of the first valve 17, flows into the connection duct 23, enters the second valve 18 from its second mouth 18*b*, exits the first mouth 18*a* of the second valve 18, flows into the delivery duct 26, and enters the chamber 32 from its first inlet mouth 33.

The water pressure in the chamber 32 is now high, sufficient to open the minimum pressure valve 36; therefore, the water exits the delivery mouth 35 and through the nozzle 37 is directed towards the patient. It should be noted that the first water to reach the patient is the water that was already in chamber 32, and therefore already has the desired temperature; this temperature is then maintained approximately constant, since the water continues to be supplied from the tank 40. Naturally, both in the tank 40 and in all the ducts, the water will tend to cool down, but gradually, without therefore subjecting the patient to unpleasant changes in temperature; obviously, both the tank 40 and the ducts are preferably made of a plastic material with low thermal conductivity, so that the water temperature can be kept adequately warm for the time it takes to empty the tank 40.

While the patient is being washed, the operator can interrupt the delivery of water from the washing head 30 as many times as he wants, by acting on the button 38, so as to activate the stand-by operation mode; again by acting on the button 38, the operator can then resume the delivery of water from the washing head 30. Even though the water delivery is intermittent, the temperature of the water delivered remains essentially constant, which is a great advantage for the comfort and health of the patient.

The invention claimed is:

1. A personal hygiene apparatus for patients with reduced mobility, comprising:

a support casing, a removable tank for washing water, a housing formed on the casing, the housing accommodating the removable tank, a grippable washing head comprising at least one delivery mouth and a flow alternating chamber connected to the at least one delivery mouth, a pump, a hydraulic circuit connecting the tank, the pump and the washing head with each other, the hydraulic circuit comprising a bi-directional delivery duct and a recirculation duct, the bi-directional delivery duct configured to allow the washing water to flow in a first direction and a second direction, and a valve assembly in the hydraulic circuit;

wherein the apparatus provides for a working operation mode and a standby operation mode, wherein the valve assembly:

in the working operation mode, determines in the hydraulic circuit a water supply path for the washing water from the tank, to the pump, through the bi-directional delivery duct, through the flow alternating chamber of the washing head and finally out of the at least one delivery mouth; and in the standby operation mode, determines in the hydraulic circuit a water recirculation path for the washing water from the tank, to the pump, through the recirculation duct, through the flow alternating chamber of the washing head, through the bi-directional delivery duct and finally back to the tank, without washing water flowing out of the at least one delivery mouth, wherein the pump is in continuous operation during the working operation mode and the standby operation mode such that, during the working operation mode, the washing water flows in the first direction through the bi-directional delivery duct and, during the standby operation mode, the washing water flows in the second direction through the bi-directional delivery duct.

2. The apparatus according to claim 1, wherein the valve assembly comprises a first three-way valve and a second three-way valve operating together.

3. The apparatus according to claim 2, wherein the hydraulic circuit comprises:

an intake duct, between the tank and the pump, a feed duct, between the pump and the first valve, a connection duct, between the first three-way valve and the second three-way valve, and a recovery duct between the second three-way valve and the tank, and wherein the recirculation duct is between the first three-way valve and the washing head, and the bi-directional delivery duct is between the second valve and the washing head.

4. The apparatus according to claim 3, wherein the bi-directional delivery duct is part of both the supply path and the recirculation path.

5. The apparatus according to claim 4, wherein the water supply path comprises the intake duct, the feed duct, the connection duct and the bi-directional delivery duct.

6. The apparatus according to claim 4, wherein the water recirculation path comprises the intake duct, the feed duct, the recirculation duct, the bi-directional delivery duct and the recovery duct.

7. The apparatus according to claim 3, further comprising a one-way valve in the intake duct.

8. The apparatus according to claim 3, further comprising an expansion vessel in the feed duct.

9. The apparatus according to claim 3, further comprising a pressure reducer in the recirculation duct.

10. The apparatus according to claim 1, further comprising a minimum pressure valve in the washing head, between the flow alternating chamber and the at least one delivery mouth.

11. The apparatus according to claim 3, wherein the intake duct and the recovery duct are connected to the tank by a two-way quick-connect connector mounted on the tank.

* * * * *